(12) United States Patent
Liu et al.

(10) Patent No.: US 10,771,303 B2
(45) Date of Patent: Sep. 8, 2020

(54) OVERLAPPED MULTIPLEXING-BASED DECODING METHOD AND DEVICE, AND MODULATION AND DEMODULATION METHOD AND SYSTEM

(71) Applicant: Shenzhen Super Data Link Technology Ltd., Guangdong (CN)

(72) Inventors: Ruopeng Liu, Guangdong (CN); Chunlin Ji, Guangdong (CN); Xingan Xu, Guangdong (CN); Shasha Zhang, Guangdong (CN)

(73) Assignee: SHEN ZHEN KUANG-CHI HEZHONG TECHNOLOGY LTD, Shenzhen (CN)

( * ) Notice: Subject to any disclaimer, the term of this patent is extended or adjusted under 35 U.S.C. 154(b) by 0 days.

(21) Appl. No.: 16/377,149

(22) Filed: Apr. 5, 2019

(65) Prior Publication Data

US 2019/0238384 A1    Aug. 1, 2019

Related U.S. Application Data

(63) Continuation of application No. PCT/CN2017/091966, filed on Jul. 6, 2017.

(51) Int. Cl.
*H04L 27/26* (2006.01)
*H04J 4/00* (2006.01)
*H04L 27/04* (2006.01)
*H04L 1/00* (2006.01)

(52) U.S. Cl.
CPC ............ *H04L 27/2649* (2013.01); *H04J 4/00* (2013.01); *H04L 1/00* (2013.01); *H04L 27/04* (2013.01); *H04L 27/2627* (2013.01)

(58) Field of Classification Search
CPC ....... H04L 27/2649; H04L 27/04; H04L 1/00; H04L 27/2627; H04L 1/0047; H04L 1/005; H04L 1/0045; H04L 1/0052; H04J 4/00
See application file for complete search history.

(56) References Cited

U.S. PATENT DOCUMENTS 10,419,261 B2 * 9/2019 Liu ................. H04L 5/0007
2019/0238255 A1 * 8/2019 Liu ..................... H04J 15/00

FOREIGN PATENT DOCUMENTS

| CN | 101262232 A | 9/2008 |
|---|---|---|
| CN | 101431393 A | 5/2009 |
| CN | 101471689 A | 7/2009 |

(Continued)

OTHER PUBLICATIONS

Xin Jin, et al., "Decoding OvTDM with sphere-decoding algorithm", The Journal of China Universities of Posts and Telecommunications, Dec. 2008, 15(4): 35-39.

(Continued)

*Primary Examiner* — Hashim S Bhatti
(74) *Attorney, Agent, or Firm* — Cantor Colburn LLP

(57) ABSTRACT

In an overlapped multiplexing-based decoding method and device, and modulation and demodulation method and system provided in this application, a convolution operation with a header and without a tail is split into group operations with both a header and a tail by using a slide group decoding scheme and based on association between adjacent symbols in an OvXDM system, and then each group of sequences is decoded by using a corresponding decoding algorithm.

15 Claims, 9 Drawing Sheets

(56) References Cited

FOREIGN PATENT DOCUMENTS

| CN | 101557364 A | 10/2009 |
|---|---|---|
| CN | 105553536 A | 5/2016 |
| WO | 2008006246 A1 | 1/2008 |

OTHER PUBLICATIONS

Hao Wang, et al., "Time-frequency Overlapped Multiplex System and Fast Detection Approach", Journal of Beijing University of Technology, vol. 37, No. 1, Jan. 2011.
English Translation of International Search Report dated Sep. 30, 2017 for PCT/CN2017/091966; filed Jul. 6, 2017, 3 pages.

* cited by examiner $$a_0x_0 \quad a_1x_0 \quad a_2x_0 \quad \cdots \quad a_{k-1}x_0$$

$$a_0x_1 \quad a_1x_1 \quad a_2x_1 \quad \cdots \quad a_{k-1}x_1$$

$$a_0x_2 \quad a_1x_2 \quad a_2x_2 \quad \cdots \quad a_{k-1}x_2$$

$$\cdots$$

$$a_0x_{k-1} \quad a_1x_{k-1} \quad a_2x_{k-1} \quad \cdots \quad a_{k-1}x_{k-1}$$

ions. FIG. 1 is a schematic diagram
OVERLAPPED MULTIPLEXING-BASED DECODING METHOD AND DEVICE, AND MODULATION AND DEMODULATION METHOD AND SYSTEM

CROSS-REFERENCE TO RELATED APPLICATIONS

This application is a continuation application of PCT/CN2017/091966, filed Jul. 6, 2017, published as WO 2018/068541, which claims the priority of Chinese Application No. 201610884841.2, filed Oct. 10, 2016. The contents of the above-identified applications are incorporated herein by reference in their entireties.

TECHNICAL FIELD

This application relates to the communications field, and in particular, to an overlapped multiplexing-based decoding method and device, and modulation and demodulation method and system.

BACKGROUND

A modulation and demodulation technology based on overlapped multiplexing (OvXDM: Overlapped X Division Multiplexing) includes a plurality of specific implementation solutions, for example, a modulation and demodulation technology based on overlapped time division multiplexing (OvTDM: Overlapped Time Division Multiplexing), a modulation and demodulation technology based on overlapped frequency division multiplexing (OvFDM: Overlapped Frequency Division Multiplexing), a modulation and demodulation technology based on overlapped code division multiplexing (OvCDM: Overlapped Code Division Multiplexing), a modulation and demodulation technology based on overlapped space division multiplexing (OvSDM: Overlapped Space Division Multiplexing), and a modulation and demodulation technology based on overlapped hybrid division multiplexing (OvHDM: Overlapped Hybrid Division Multiplexing).

It should be noted that in OvXDM mentioned in this application, X represents any domain, for example, time T, space S, frequency F, code C, and hybrid H.

The following provides brief description by using OvTDM as an example.

First, time division (hereinafter referred to as TD) multiplexing (TDM: Time Division Multiplexing) is a technology in which a plurality of signal symbols occupying relatively narrow time durations share one relatively wide time duration in digital communication. FIG. 1 is a schematic diagram of a conventional time division multiplexing technology.

In FIG. 1, time durations (referred to as timeslot widths in engineering) of multiplexed signal symbols are respectively T1, T2, T3, T4, . . . , and in engineering, the signal symbols usually occupy a same timeslot bandwidth. ΔT is a minimum guard timeslot, and an actual guard timeslot width should be larger. ΔT should be greater than a sum of a transition time width of a used demultiplexing gate circuit and a maximum time jitter of a system. This is a most common time division multiplexing technology. This technology is used in most existing systems such as multichannel digital broadcast systems and multichannel digital communications systems.

A most significant feature of this technology when it is applied to digital communications is: Multiplexed signal symbols are fully isolated from each other in terms of time, without mutual interference. The multiplexed signal symbols are not limited, and symbol durations (timeslot widths) of signals may have different widths. In addition, this technology is applicable to different communications mechanisms, provided that timeslots of the multiplexed signal symbols do not overlap or cross with each other. Therefore, this technology is most widely used. However, such multiplexing has no effect in improving spectral efficiency of a system.

Therefore, a conventional idea is that adjacent channels do not overlap in time domain, to avoid interference between the adjacent channels. However, this technology limits improvement of spectral efficiency. An idea of a time division multiplexing technology in the prior art is that channels do not need to be isolated from each other and may strongly overlap with each other. As shown in FIG. 2, in the prior art, overlapping between channels is considered as a new coding constraint relationship, and corresponding modulation and demodulation technologies are proposed based on the constraint relationship. Therefore, a technology is referred to as overlapped time division multiplexing (OvTDM: Overlapped Time Division Multiplexing). In this technology, spectral efficiency increases proportionally with a quantity K of times of overlapping.

Referring to FIG. 3, an overlapped time division multiplexing system includes a transmitter A01 and a receiver A02.

The transmitter A01 includes an overlapped time division multiplexing-based modulation device 101 and a transmission device 102. The overlapped time division multiplexing-based modulation device 101 is configured to generate a complex modulated envelope waveform carrying an input signal sequence. The transmission device 102 is configured to transmit the complex modulated envelope waveform to the receiver A02.

The receiver A02 includes a receiving device 201 and a sequence detection device 202. The receiving device 201 is configured to receive the complex modulated envelope waveform transmitted by the transmission device 102. The sequence detection device 202 is configured to perform data sequence detection on the received complex modulated envelope waveform in time domain, to perform decision output.

Usually, the receiver A02 further includes a preprocessing device 203 between the receiving device 201 and the sequence detection device 202, configured to assist in forming a synchronously received digital signal sequence in each frame.

In the transmitter A01, the input digital signal sequence forms, by using the overlapped time division multiplexing-based modulation device 101, transmit signals that have a plurality of symbols overlapped in time domain; and then the transmission device 102 transmits the transmit signals to the receiver A02. The receiving device 201 of the receiver A02 receives the signals transmitted by the transmission device 102. The signals form, by using the preprocessing device 203, digital signals suitable for the sequence detection device 202 to detect and receive. The sequence detection device 202 performs data sequence detection on the received signals in time domain, to output a decision.

Referring to FIG. 4, the overlapped time division multiplexing-based modulation device 101 (OvTDM modulation device) includes a waveform generation module 301, a shift module 302, a multiplication module 303, and a superimposition module 304.

The waveform generation module 301 is configured to generate, based on a design parameter, an initial envelope waveform whose waveform is smooth in time domain.

The shift module 302 is configured to shift the initial envelope waveform in time domain at a preset shift interval based on a quantity of times of overlapped multiplexing, to obtain shifted envelope waveforms at fixed intervals.

The modulation module 305 is configured to convert an input digital signal sequence into a signal symbol sequence represented by using positive and negative symbols.

The multiplication module 303 is configured to multiply the signal symbol sequence by offset shifted envelope waveforms at fixed intervals, to obtain modulated envelope waveforms.

The superimposition module 304 is configured to superimpose the modulated envelope waveforms in time domain, to obtain a complex modulated envelope waveform carrying the input signal sequence.

FIG. 5 is a block diagram of the preprocessing device 203 of the receiver A02.

The preprocessing device 203 includes a synchronizer 501, a channel estimator 502, and a digital processor 503. The synchronizer 501 implements symbol time synchronization of received signals in the receiver. Next, the channel estimator 502 estimates a channel parameter. The digital processor 503 performs digital processing on received signals in each frame, to form a digital signal sequence suitable for the sequence detection device to perform sequence detection and receive.

FIG. 6 is a block diagram of the sequence detection device 202 of the receiver A02.

The sequence detection device 202 includes an analysis unit memory 601, a comparator 602, and a plurality of retained path memories 603 and Euclidean distance memories 604 or weighted Euclidean distance memories (not shown in the figure). In a detection process, the analysis unit memory 601 makes a complex convolutional coding model and a trellis diagram of the overlapped time division multiplexing system, and lists and stores all states of the overlapped time division multiplexing system; the comparator 602 finds, based on the trellis diagram in the analysis unit memory 601, a path with a minimum Euclidean distance or a weighted minimum Euclidean distance to a received digital signal; and the retained path memories 603 and the Euclidean distance memories 604 or the weighted Euclidean distance memories are respectively configured to store a retained path and an Euclidean distance or a weighted Euclidean distance that are output by the comparator 602. One retained path memory 603 and one Euclidean distance memory 604 or weighted Euclidean distance memory need to be prepared for each stable state. Preferably, a length of the retained path memory 603 may be 4K-5K. Preferably, the Euclidean distance memory 604 or the weighted Euclidean distance memory stores only a relative distance.

In an OvXDM system, a signal transmitter modulates a signal and then sends a modulated signal to a signal receiver, and the signal receiver demodulates the modulated signal after receiving it. A demodulation process includes a decoding step (that is, the sequence detection step performed by the foregoing sequence detection device). In conventional decoding, a node in a folded tree diagram (Trellis diagram) needs to be continuously accessed. In addition, two memories are disposed for each node. One is configured to store an Euclidean distance of a relative best path for reaching the node, and the other is configured to store the relative best path for reaching the node. For a system in which a quantity of times of overlapping is K and whose modulation dimensionality is M, a quantity of nodes in the trellis diagram is $M^K$. Each node needs to be extended in a decoding process. Therefore, the quantity of nodes determines decoding complexity, and the decoding complexity increases exponentially with the quantity of times of overlapping. It is well-known that, in the OvXDM system, spectral efficiency increases as the quantity K of times of overlapping increases, and therefore the quantity K of times of overlapping needs to be increased as far as possible. However, in a conventional decoding algorithm such as Viterbi decoding, when the quantity of times of overlapping increases to a specific value (K>8), the decoding complexity increases sharply. An existing decoding method cannot meet a real-time decoding requirement, and the spectral efficiency and a decoding rate become contradictory. Therefore, the decoding complexity needs to be reduced, and decoding efficiency needs to be improved.

SUMMARY

This application provides an overlapped multiplexing-based decoding method and device, and modulation and demodulation method and system, so as to resolve problems in a conventional decoding method such as Viterbi decoding that, although decoding performance is relatively good, massive storage resources (path storage and distance storage) are required, decoding complexity increases exponentially with a quantity K of times of overlapped multiplexing, improvement on a decoding rate and improvement on spectral efficiency become contradictory, and the method is not practical. Therefore, the decoding rate can be improved while the spectral efficiency is ensured.

According to a first aspect of this application, this application provides an overlapped multiplexing-based decoding method, including:

step 1: setting a group sequence length based on a length of a multiplexing waveform in a received signal, and grouping receive sequences in the received signal;

step 2: converting a multiplexing waveform coefficient into a matrix form based on the group sequence length;

step 3: decoding a receive sequence of a current group by using a preset algorithm, to obtain a transmit sequence of the current group in an original signal;

step 4: removing known information in the receive sequence of the current group;

step 5: sliding the receive sequence backward, and repeating step 3 and step 4, until all groups are decoded; and step 6: outputting a decoding result after all the groups are decoded.

According to a second aspect of this application, this application further provides an overlapped multiplexing-based decoding device, including:

a grouping module, configured to set a group sequence length based on a length of a multiplexing waveform in a received signal, and group receive sequences in the received signal;

a conversion module, configured to convert a multiplexing waveform coefficient into a matrix form based on the group sequence length;

a decoding module, configured to decode a receive sequence of a current group by using a preset algorithm, to obtain a transmit sequence of the current group in an original signal;

a known information removal module, configured to remove known information in the receive sequence of the current group;

a sliding module, configured to slide the receive sequence backward, and control the decoding module and the known information removal module to repeatedly perform a decoding step, until all groups are decoded; and an output module, configured to output a decoding result after all the groups are decoded.

According to a third aspect of this application, this application further provides an overlapped multiplexing-based modulation and demodulation method, including a modulation step and a demodulation step, where the modulation step includes:

generating an initial envelope waveform;

shifting the initial envelope waveform in a corresponding domain at a shift interval based on a quantity of times of overlapped multiplexing, to obtain shifted envelope waveforms at fixed intervals;

converting an input digital signal sequence into a signal symbol sequence represented by using positive and negative symbols;

multiplying the signal symbol sequence by offset shifted envelope waveforms at fixed intervals, to obtain modulated envelope waveforms;

superimposing the modulated envelope waveforms in the corresponding domain, to obtain a complex modulated envelope waveform carrying the digital signal sequence; and transmitting the complex modulated envelope waveform; and in the demodulation step, the foregoing decoding method is used.

According to a fourth aspect of this application, this application further provides an overlapped multiplexing-based modulation and demodulation system, including a transmitter and a receiver, where the transmitter includes a modulation device and a transmission device, and the modulation device includes:

a waveform generation module, configured to generate an initial envelope waveform;

a shift module, configured to shift the initial envelope waveform in a corresponding domain at a shift interval based on a quantity of times of overlapped multiplexing, to obtain shifted envelope waveforms at fixed intervals;

a modulation module, configured to convert an input digital signal sequence into a signal symbol sequence represented by using positive and negative symbols;

a multiplication module, configured to multiply the signal symbol sequence by offset shifted envelope waveforms at fixed intervals, to obtain modulated envelope waveforms; and a superimposition module, configured to superimpose the modulated envelope waveforms in the corresponding domain, to obtain a complex modulated envelope waveform carrying the input signal sequence;

the transmission device is configured to transmit the complex modulated envelope waveform; and the receiver includes a receiving device configured to receive the complex modulated envelope waveform, and the foregoing decoding device.

In the overlapped multiplexing-based decoding method and device, and modulation and demodulation method and system provided in this application, a convolution operation with a header and without a tail is split into group operations with both a header and a tail by using a slide group decoding scheme and based on association between adjacent symbols in an OvXDM system, and then each group of sequences is decoded by using a corresponding decoding algorithm, thereby improving decoding efficiency, and reducing decoding complexity while ensuring relatively good performance of the system. This resolves problems in a conventional communications system that, when a Viterbi decoding scheme is used, per-symbol decoding is performed on a receive sequence, and therefore decoding efficiency is relatively row, and decoding complexity increases as a quantity of times of overlapping increases.

DESCRIPTION OF EMBODIMENTS

Figure 1:
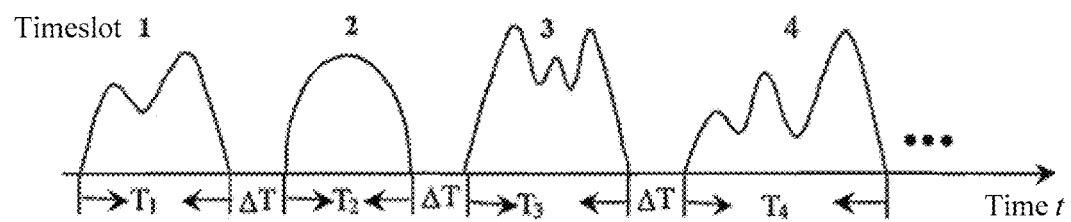
FIG. 1 is a schematic diagram of a conventional time division multiplexing technology.
Figure 2:
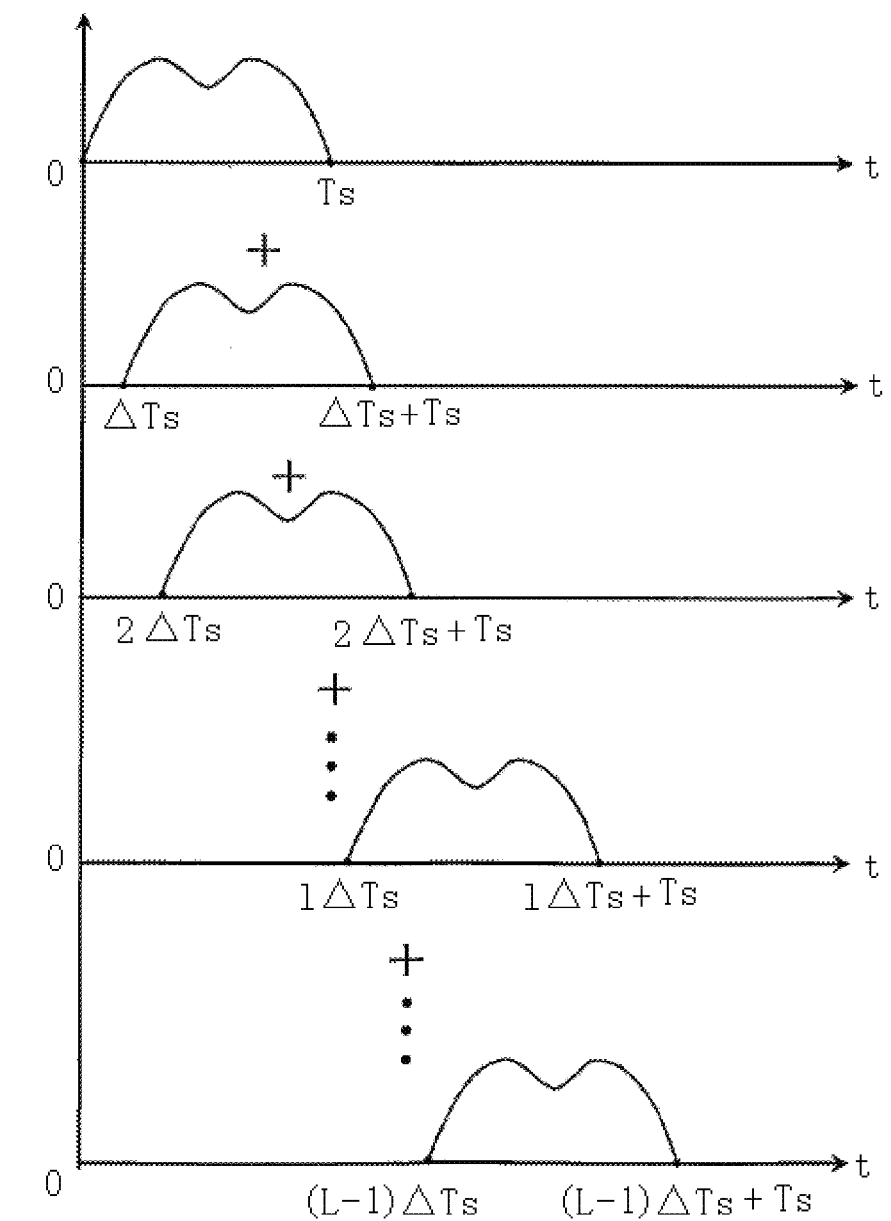
FIG. 2 is a schematic diagram of an overlapped time division multiplexing principle.

First, it should be noted that, in an overlapped multiplexing (OvXDM)-based decoding method and device, and modulation and demodulation method and system provided in this application, X represents any domain, for example, time T, space S, frequency F, code C, and hybrid H. For ease of description, embodiments of this application are mainly described by using overlapped time division multiplexing (OvTDM) as an example. Persons skilled in the art should know that the overlapped multiplexing-based decoding method and device, and modulation and demodulation method and system protected by the claims of this application may also be applied to overlapped multiplexing technologies in other domains.

During research on overlapped multiplexing-based modulation and demodulation technologies, persons skilled in the art use conventional decoding methods. In the conventional decoding methods, a node in a folded tree diagram (Trellis diagram) needs to be continuously accessed. In addition, two memories are disposed for each node. One is configured to store an Euclidean distance of a relative best path for reaching the node, and the other is configured to store the relative best path for reaching the node. For a system in which a quantity of times of overlapping is K and whose modulation dimensionality is M, a quantity of nodes in the trellis diagram is $M^K$. Each node needs to be extended in a decoding process. Therefore, the quantity of nodes determines decoding complexity, and the decoding complexity increases exponentially with the quantity of times of overlapping. It is well-known that, in the OvXDM system, spectral efficiency increases as the quantity K of times of overlapping increases, and therefore the quantity K of times of overlapping needs to be increased as far as possible. However, in a conventional decoding algorithm such as Viterbi decoding, when the quantity of times of overlapping increases to a specific value (K>8), the decoding complexity increases sharply. An existing decoding method cannot meet a real-time decoding requirement, and the spectral efficiency and a decoding rate become contradictory.

Although the existing decoding methods have the foregoing problem, because these methods have been widely used, persons skilled in the art have fully accepted the methods, without taking efforts to look for a better method.

In this application, the inventor uses a different technical concept. A convolution operation with a header and without a tail is split into group operations with both a header and a tail by using a slide group decoding scheme and based on association between adjacent symbols in an OvXDM system, and then each group of sequences is decoded by using a corresponding decoding algorithm, thereby improving decoding efficiency, and reducing decoding complexity while ensuring relatively good performance of the system. This resolves problems in a conventional communications system that, when a Viterbi decoding scheme is used, per-symbol decoding is performed on a receive sequence, and therefore decoding efficiency is relatively row, and decoding complexity increases as a quantity of times of overlapping increases.

The following further describes this application in detail with reference to specific embodiments and accompanying drawings.

Embodiment 1

Figure 7:
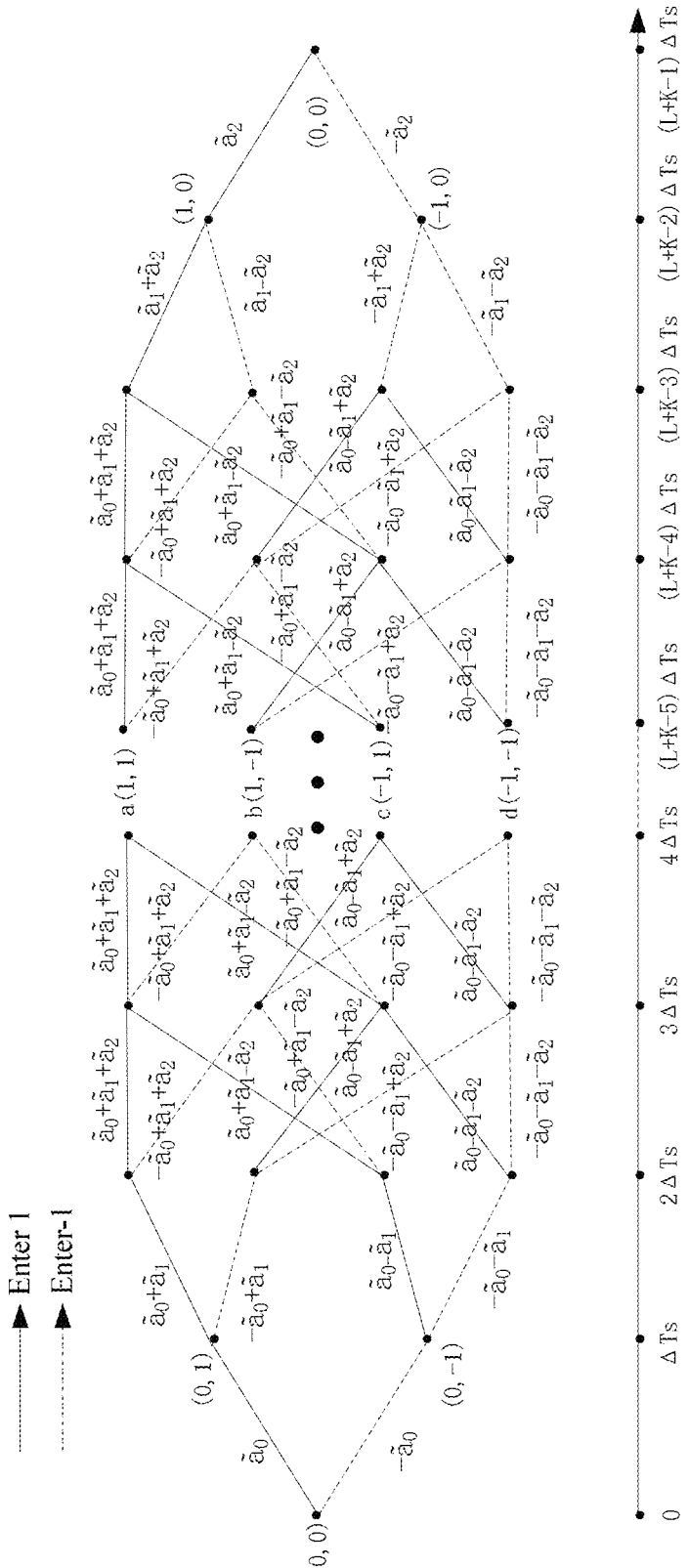
FIG. 7 is a trellis diagram of OvTDM.

Viterbi (Viterbi) decoding is a most widely used method in a convolutional code. A basic idea of the Viterbi decoding is: traversing all paths in a trellis diagram (FIG. 7 is a trellis diagram of OvTDM), comparing distances between a plurality of branches arriving at each state and a correct path in a state transition process in the trellis diagram, retaining only a path with a smallest distance, and obtaining an estimate of the correct path through comparison and screening, to implement decoding. However, as a quantity K of times of overlapping increases, a quantity M=2^K of states in the Viterbi decoding increases exponentially. As a result, computation complexity of the algorithm sharply increases, thereby failing to meet a real-time decoding requirement.

This embodiment provides an overlapped multiplexing-based decoding method, in which a slide group decoding scheme is used, to address relatively low decoding efficiency and relatively high decoding complexity in an OvXDM system.

Figure 8:
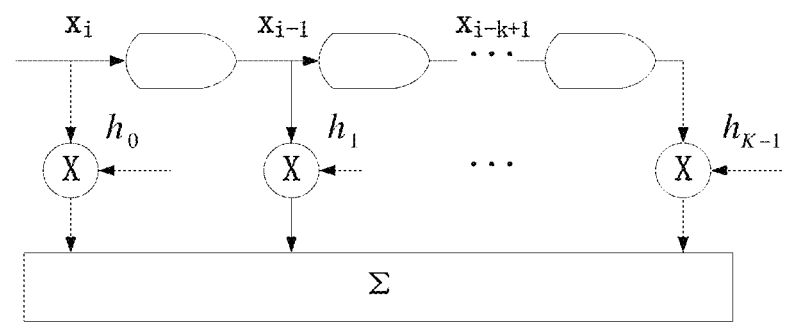
FIG. 8 is a diagram of an equivalent convolutional coding model of an OvXDM system.

The OvXDM system is actually an equivalent convolutional coding system. A coding model of the OvXDM system is shown in FIG. 8. It is assumed that an N-bit symbol sequence X={$x_0, x_1, x_2, \ldots x_{N-1}$} is included in OvXDM in a group processing interval $\chi$, L is a truncation interval (a real-truncation interval or a virtual-truncation interval) of a multiplexing waveform h(x), and K is a quantity of times of shifting and overlapping. Then a symbol sequence length is NL/K. A convolution operation is performed on the sequence and a multiplexing waveform H=[$h_0, h_1, \ldots h_{K-1}$] based on this model, to obtain a coded information sequence Y, so as to implement mutual shifting and overlapped multiplexing between symbols.

A shifting and convolution process may be represented by a formula $$y = \sum_{i=0}^{N-1} x_i h(t - i \times \Delta T),$$

where i=0~N-1. If the formula is expanded, the coded information sequence may be represented as $y_i = x_{i-k+1} \times h_{K-1} + x_{i-K+2} \times h_{K3\ 1\ 2} + \ldots + x_i \times h_0$. It can be learned from the expansion that a current symbol is associated with the first K-1 symbols.

Figure 9:
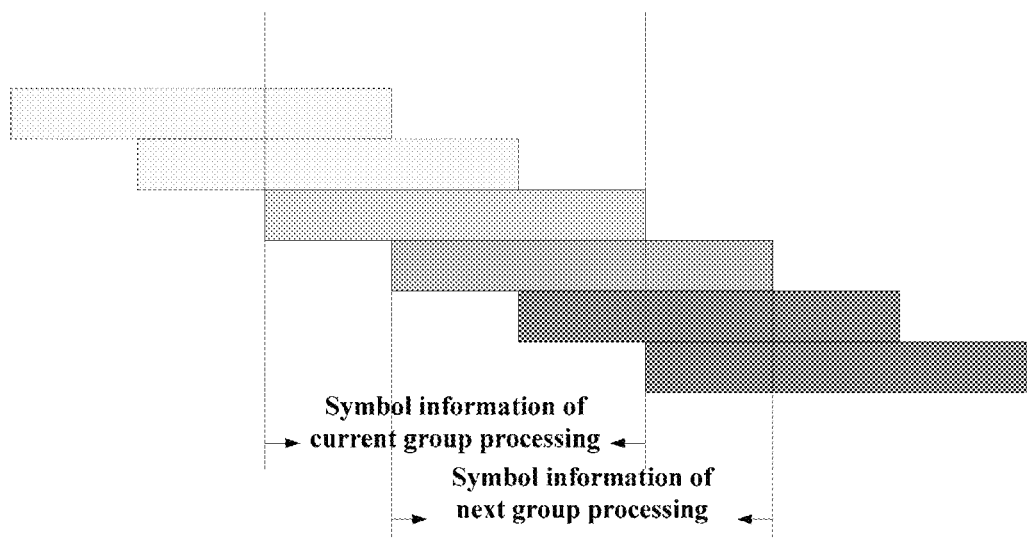
FIG. 9 is a schematic diagram of slide group decoding according to an embodiment of this application.

In the slide group decoding, the convolution operation is split into slide group operations, that is, the convolution operation with a header and without a tail is split into group operations with both a header and a tail, before decoding is performed. A schematic diagram thereof is shown in FIG. 9. A multiplexing waveform coefficient H is known at a decoder end, and OvXDM is presented in a shape of a parallelogram. Therefore, decoding may be performed from front to back or from back to front. Available group decoding methods include algorithms such as a gradient algorithm, a least squares algorithm, a steepest descent algorithm, a conjugate gradient algorithm, an accelerated conjugate gradient algorithm, and an accelerated Chebyshev algorithm.

In this embodiment, the least squares algorithm is used as an example to describe the overlapped multiplexing-based decoding method provided in this embodiment. In other embodiments, another algorithm may alternatively be used as a group decoding method, and a principle of using the algorithm is similar to that of using the least squares algorithm.

Figure 10:
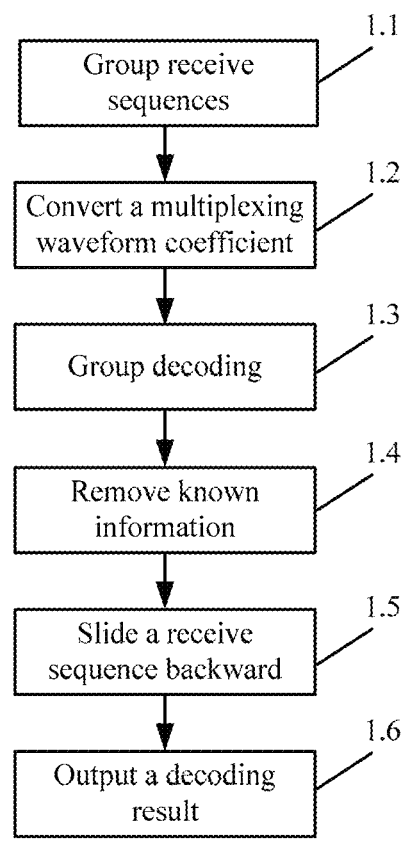
FIG. 10 is a schematic flowchart of an overlapped multiplexing-based decoding method according to an embodiment of this application.

Referring to FIG. 10, the overlapped multiplexing-based decoding method includes the following steps:

Step 1: Set a group sequence length M based on a length of a multiplexing waveform in a received signal, and group receive sequences in the received signal. The received signal is a complex modulated envelope waveform sent by a transmit end.

M is related to the length of the multiplexing waveform, and 1≤M≤L. A symbol sequence whose length is N may be divided into ⌈N/M⌉ groups, where [●] indicates rounding up.

Step 1.2: Convert a multiplexing waveform coefficient H into a matrix form based on the group sequence length M. This may be specifically represented as follows:

$$\begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \ldots & h_0 & 0 \\ 0 & h_{K-1} & h_{K-2} & \ldots & h_0 \end{bmatrix}_{M \times M}$$

Step 1.3: Decode a receive sequence of a current group by using a preset algorithm, to obtain a transmit sequence of the current group in an original signal.

The preset algorithm may be a gradient algorithm, a least squares algorithm, a steepest descent algorithm, a conjugate gradient algorithm, an accelerated conjugate gradient algorithm, or an accelerated Chebyshev algorithm. In this embodiment, the preset algorithm is the least squares algorithm.

For a matrix relationship Y=H×X, X may be calculated by using a least squares method in mathematics: $x=(H^T \times H)^{-1} \times H^T \times Y$.

Similarly, in the OvXDM system, the formula may also be represented in a form of matrix multiplication:

$$\begin{bmatrix} y'_i \\ y'_{i+1} \\ y'_{i+2} \\ \dots \\ y'_{i+M-1} \end{bmatrix}_{M \times 1} = \begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \dots & h_0 & 0 \\ 0 & h_{K-1} & h_{K-2} & \dots & h_0 \end{bmatrix}_{M \times M} \times \begin{bmatrix} x_i \\ x_{i+1} \\ x_{i+2} \\ \dots \\ x_{i+M-1} \end{bmatrix}_{M \times 1}$$

$y_i'$ is information obtained after processing is performed on a receive sequence $y_i$.

For a processing process, refer to the following step 1.4. A transmit sequence $x_i$ is calculated based on the least squares method: $X=(H^T \times H)^{-1} \times H^T \times Y'$.

Preferably, when the receive sequence of the current group is decoded by using the preset algorithm, the method further includes: storing a non-variable in the preset algorithm, and calling the non-variable during decoding. In this embodiment, because the coefficient H is known, a result of $(H^T \times H)^{-1} \times H^T$ (namely, the non-variable) may be stored in advance during actual engineering, and may be directly used in a decoding process. This can eliminate a repeated calculation process of each group, so as to save resources and time.

Step 1.4: Remove known information in the receive sequence of the current group.

With reference to FIG. 9, after a convolution relationship is expanded, it can be learned that, after expansion, each symbol may be represented as follows:

$$y_0 = x_0 \times h_0,$$

$$y_1 = x_0 \times h_1 + x_1 \times h_0,$$

$$y_2 = x_0 \times h_2 + x_1 \times h_1 + x_2 \times h_0,$$

$$\dots$$

$$y_i = x_{i-K-1} \times h_{K-1} + x_{i-K+2} \times h_{K-2} + \dots + x_i \times h_0,$$

Transmitted information $x_0 \sim x_{M-1}$ is obtained in first group decoding. In a subsequent group, because the first K−1 symbols have been obtained through calculation in previous group decoding, information about the first K−1 symbols may be removed from a current receive symbol, to ensure that the matrix form in step 1.2 is the same in each group operation. Information obtained after the removal may be represented as follows:

$$y_i' = y_i - (x_{i-K+1} \times h_{K-1} + x_{i-K+2} \times h_{K-2} + \dots + x_{i-1} \times h_1) = x_i \times h_0$$

It should be noted that no known information needs to be removed in the first group decoding.

Step 1.5: Slide the receive sequence backward, and repeat step 1.3 and step 1.4, until all groups are decoded.

Step 1.6: Output a decoding result after all the groups are decoded.

In the following, the OvTDM system is still used as an example, and it is assumed that an input information sequence is X={0, 1, 1, 0, 1, 1, 1, 0, 0}, a length is N=9, a modulation scheme is BPSK, a quantity of times of overlapped multiplexing is K=3, a multiplexing waveform is a rectangular wave whose window length is L=3, and a multiplexing coefficient is H=[1, 1, 1].

A transmit end first performs BPSK modulation on the input symbol sequence X. In this case, mapping is performed in a manner of 1->−1, 0->1, to obtain a modulated symbol sequence {+1, −1, −1, +1, −1, −1, −1, +1, +1}. OvTDM-based coding is performed on the modulated symbol sequence, to obtain a to-be-sent information sequence {1, 0, −1, −1, −1, −1, −3, −1, 1}.

A signal is transmitted in a channel. After receiving the signal, a receive end first performs processing on the signal, such as synchronization, channel estimation, and equalization, to obtain a to-be-decoded sequence y={1, 0, −1, −1, −1, −1, −3, −1, 1}. Decoding is performed by using a least squares slide group decoding scheme. A decoding process is as follows:

(1) Set a group sequence length M. In this case, M=3. Data whose length is N may be divided into N/M=3 groups.

(2) Convert a multiplexing coefficient into a matrix form:

$$\begin{bmatrix} h_0 & 0 & 0 \\ h_1 & h_0 & 0 \\ h_2 & h_1 & h_0 \end{bmatrix} = \begin{bmatrix} 1 & 0 & 0 \\ 1 & 1 & 0 \\ 1 & 1 & 1 \end{bmatrix}.$$

(3) Decode a received sequence based on the least squares algorithm.

Using first group decoding as an example, the first group decoding may be represented as $$\begin{bmatrix} y_0 \\ y_1 \\ y_2 \end{bmatrix} = \begin{bmatrix} h_0 & 0 & 0 \\ h_1 & h_0 & 0 \\ h_2 & h_1 & h_0 \end{bmatrix} \times \begin{bmatrix} x_0 \\ x_1 \\ x_2 \end{bmatrix},$$

where $[y_0, y_1, y_2] = [1, 0, -1]$.

A transmit sequence $[x_0, x_1, x_2]=[+1, -1, -1]$ may be obtained based on a formula $X=(H^T \times H)^{-1} \times H^T \times Y'$.

(4) Remove known information in the received sequence. For a second group $$y_3 = x_3 \times h_0 + x_2 \times h_1 + x_1 \times h_2$$

$$y_4 = x_4 \times h_0 + x_3 \times h_1 + x_2 \times h_2$$

$$y_5 = x_5 \times h_0 + x_4 \times h_1 + x_3 \times h_2,$$

because $x_1$, $x_2$ has been obtained through calculation in the first group, known information may be removed for $y_3$, $y_4$, to obtain a relational expression after the removal:

$$y_3' = x_3 \times h_0$$

$$y_4' = x_4 \times h_0 + x_3 \times h_1$$

$$y_5' = x_5 \times h_0 + x_4 \times h_1 + x_3 \times h_2.$$

A corresponding matrix form is still $$\begin{bmatrix} h_0 & 0 & 0 \\ h_1 & h_0 & 0 \\ h_2 & h_1 & h_0 \end{bmatrix}.$$

(5) Slide the receive sequence backward, and repeat step (3) and step (4), until decoding processes of all groups are completed.

(6) Output a decoding result.

A decoded symbol sequence is {+1, −1, −1, +1, −1, −1, −1, +1, +1}.

The symbol sequence is converted into a {0, 1} sequence according to the BPSK mapping manner, and a decoding process of the symbol sequence ends.

Embodiment 2

Corresponding to Embodiment 1, this embodiment correspondingly provides an overlapped multiplexing-based decoding device. Likewise, in this embodiment, a least squares algorithm is used as an example to describe the overlapped multiplexing-based decoding device provided in this embodiment. In other embodiments, another algorithm may alternatively be used as a group decoding method, and a principle of using the algorithm is similar to that of using the least squares algorithm.

Figure 11:
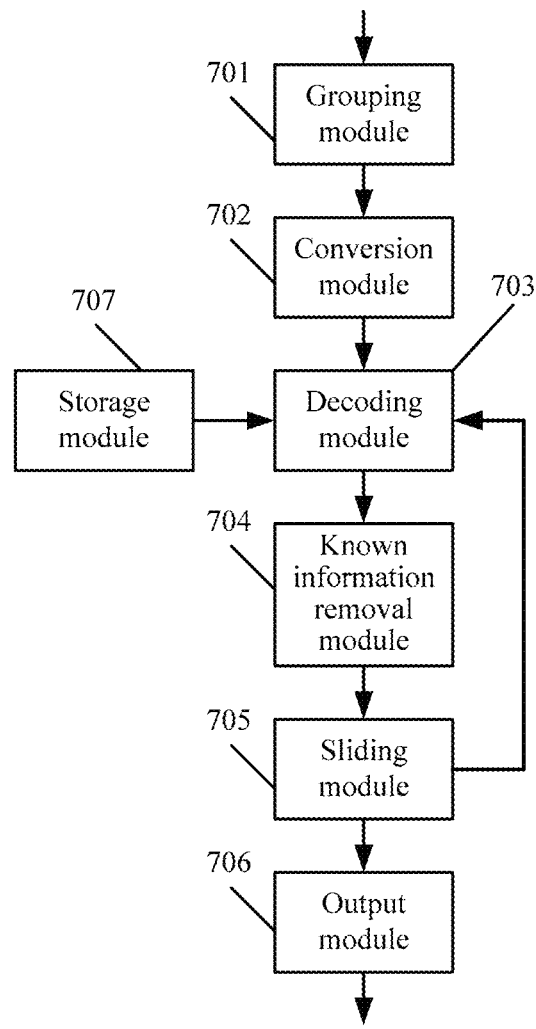
FIG. 11 is a schematic diagram of modules in an overlapped multiplexing-based decoding device according to an embodiment of this application.

Referring to FIG. 11, the overlapped multiplexing-based decoding device includes a grouping module 701, a conversion module 702, a decoding module 703, a known information removal module 704, a sliding module 705, and an output module 706.

The grouping module 701 is configured to set a group sequence length M based on a length of a multiplexing waveform in a received signal, and group receive sequences in the received signal. The received signal is a complex modulated envelope waveform sent by a transmit end.

M is related to the length of the multiplexing waveform, and 1≤M≤L. A symbol sequence whose length is N may be divided into ⌈N/M⌉ groups, where ⌈●⌉ indicates rounding up.

The conversion module 702 is configured to convert a multiplexing waveform coefficient H into a matrix form based on the group sequence length M. This may be specifically represented as follows:

$$\begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \cdots & h_0 & 0 \\ 0 & h_{K-1} & h_{K-2} & \cdots & h_0 \end{bmatrix}_{M \times M}$$

The decoding module 703 is configured to decode a receive sequence of a current group by using a preset algorithm, to obtain a transmit sequence of the current group in an original signal.

The preset algorithm may be a gradient algorithm, the least squares algorithm, a steepest descent algorithm, a conjugate gradient algorithm, an accelerated conjugate gradient algorithm, or an accelerated Chebyshev algorithm. In this embodiment, the preset algorithm is the least squares algorithm.

For a matrix relationship Y=H× X, X may be calculated by using a least squares method in mathematics: X=(H$^T$× H)$^{-1}$×H$^T$×Y.

Similarly, in the OvXDM system, the formula may also be represented in a form of matrix multiplication:

$$\begin{bmatrix} y'_i \\ y'_{i+1} \\ y'_{i+2} \\ \vdots \\ y'_{i+M-1} \end{bmatrix}_{M \times 1} = \begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \cdots & h_0 & 0 \\ & h_{K-1} & h_{K-2} & \cdots & h_0 \end{bmatrix}_{M \times M} \times \begin{bmatrix} x_i \\ x_{i+1} \\ x_{i+2} \\ \vdots \\ x_{i+M-1} \end{bmatrix}_{M \times 1}$$

$y_i'$ is information obtained after processing is performed on a receive sequence $y_i$. For a processing process, refer to a step performed by the known information removal module 704. A transmit sequence $x_i$ is calculated based on the least squares method: X=(H$^T$×H)$^{-1}$×H$^T$×Y'.

Preferably, the decoding device provided in this embodiment further includes a storage module 707, configured to store a non-variable in the preset algorithm, and the decoding module 703 calls the non-variable during decoding. In this embodiment, because the coefficient H is known, a result of (H$^T$×H)$^{-1}$× H$^T$ (namely, the non-variable) may be stored in advance during actual engineering, and may be directly used in a decoding process. This can eliminate a repeated calculation process of each group, so as to save resources and time.

The known information removal module 704 is configured to remove known information in the receive sequence of the current group.

With reference to FIG. 9, after a convolution relationship is expanded, it can be learned that, after expansion, each symbol may be represented as follows:

$y_0 = x_0 \times h_0,$ $y_1 = x_0 \times h_1 + x_1 \times h_0,$ $y_2 = x_0 \times h_2 + x_1 \times h_1 + x_2 \times h_0,$

...

$y_i = x_{i-K+1} \times h_{K-1} + x_{i-K+2} \times h_{K-2} + \ldots + x_i \times h_0,$ Transmitted information $x_0$~$x_{M-1}$ is obtained in first group decoding. In a subsequent group, because the first K−1 symbols have been obtained through calculation in previous group decoding, information about the first K−1 symbols may be removed from a current receive symbol, to ensure that the matrix form in the conversion module 702 is the same in each group operation. Information obtained after the removal may be represented as follows:

$y_i' = y_i - (x_{i-K+1} \times h_{K-1} + x_{i-K+2} \times h_{K-2} + \ldots + x_{i-1} \times h_1) = x_i \times h_0$ It should be noted that no known information needs to be removed in the first group decoding.

The sliding module 705 is configured to slide the receive sequence backward, and control the decoding module 703 and the known information removal module 704 to repeatedly perform a decoding step, until all groups are decoded.

The output module 706 is configured to output a decoding result after all the groups are decoded.

In the following, the OvTDM system is still used as an example, and it is assumed that an input information sequence is X={0, 1, 1, 0, 1, 1, 1, 0, 0}, a length is N=9, a modulation scheme is BPSK, a quantity of times of overlapped multiplexing is K=3, a multiplexing waveform is a rectangular wave whose window length is L=3, and a multiplexing coefficient is H=[1, 1, 1].

A transmit end first performs BPSK modulation on the input symbol sequence X. In this case, mapping is performed in a manner of 1->−1, 0->1, to obtain a modulated symbol sequence {+1, −1, −1, +1, −1, −1, −1, +1, +1}. OvTDM-based coding is performed on the modulated symbol sequence, to obtain a to-be-sent information sequence {1, 0, −1, −1, −1, −1, −3, −1, 1}.

A signal is transmitted in a channel. After receiving the signal, a receive end first performs processing on the signal, such as synchronization, channel estimation, and equalization, to obtain a to-be-decoded sequence y={1, 0, −1, −1, −1, −1, −3, −1, 1}. Decoding is performed by using a least squares slide group decoding scheme. A decoding process is as follows:

(1) The grouping module 701 is configured to set a group sequence length M. In this case, M=3. Data whose length is N may be divided into N/M=3 groups.

(2) The conversion module 702 is configured to convert a multiplexing coefficient into a matrix form:

$$\begin{bmatrix} h_0 & 0 & 0 \\ h_1 & h_0 & 0 \\ h_2 & h_1 & h_0 \end{bmatrix} = \begin{bmatrix} 1 & 0 & 0 \\ 1 & 1 & 0 \\ 1 & 1 & 1 \end{bmatrix}.$$

(3) The decoding module 703 is configured to decode a received sequence based on the least squares algorithm.

Using first group decoding as an example, the first group decoding may be represented as $$\begin{bmatrix} y_0 \\ y_1 \\ y_2 \end{bmatrix} = \begin{bmatrix} h_0 & 0 & 0 \\ h_1 & h_0 & 0 \\ h_2 & h_1 & h_0 \end{bmatrix} \times \begin{bmatrix} x_0 \\ x_1 \\ x_2 \end{bmatrix},$$

where $[y_0, y_1, y_2] = [1, 0, -1]$.

A transmit sequence $X=(H^T \times H)^{-1} \times H^T \times Y'$ may be obtained based on a formula $[x_0, x_1, x_2]=[+1, -1, -1]$.

(4) The known information removal module 704 is configured to remove known information in the receive sequence.

For a second group $$y_3 = x_3 \times h_0 + x_2 \times h_1 + x_1 \times h_2$$
$$y_4 = x_4 \times h_0 + x_3 \times h_1 + x_2 \times h_2$$
$$y_5 = x_5 \times h_0 + x_4 \times h_1 + x_3 \times h_2,$$

because $x_1$, $x_2$ has been obtained through calculation in the first group, known information may be removed for $y_3$, $y_4$, to obtain a relational expression after the removal:

$$y'_3 = x_3 \times h_0$$

$$y'_4 = x_4 \times h_0 + x_3 \times h_1$$
$$y'_5 = x_5 \times h_0 + x_4 \times h_1 + x_3 \times h_2.$$

A corresponding matrix form is still $$\begin{bmatrix} h_0 & 0 & 0 \\ h_1 & h_0 & 0 \\ h_2 & h_1 & h_0 \end{bmatrix}.$$

(5) The sliding module 705 is configured to slide the receive sequence backward, and repeat step (3) and step (4), until decoding processes of all groups are completed.

(6) The output module 706 is configured to output a decoding result.

A decoded symbol sequence is {+1, −1, −1, +1, −1, −1, −1, +1, +1}.

The symbol sequence is converted into a {0, 1} sequence according to the BPSK mapping manner, and a decoding process of the symbol sequence ends.

Embodiment 3

This embodiment provides an overlapped multiplexing-based modulation and demodulation method, including a modulation step and a demodulation step. This embodiment is mainly described by using overlapped time division multiplexing-based modulation and demodulation.

Figures 12, 13:
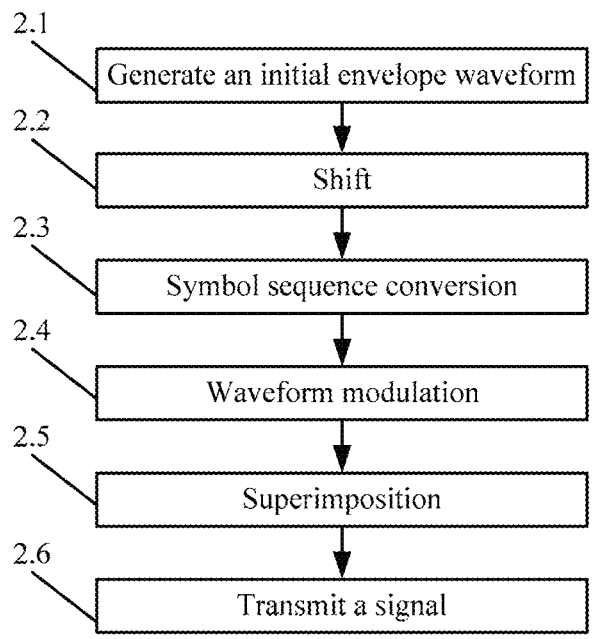
FIG. 12 is a schematic flowchart of a modulation step in an overlapped multiplexing-based modulation and demodulation method according to an embodiment of this application.
FIG. 13 is a schematic principle diagram of multiplexing of K waveforms.

As shown in FIG. 12, the modulation step includes the following substeps:

Step 2.1: Generate an initial envelope waveform h(t) in time domain based on a design parameter.

During generation of the initial envelope waveform, a user may enter the design parameter, to implement flexible configuration in an actual system based on a system performance indicator.

In some embodiments, when side lobe attenuation of the initial envelope waveform has been determined, the design parameter includes a window length L of the initial envelope waveform, for example, when the initial envelope waveform is a Bartlett envelope waveform.

In some embodiments, the design parameter includes a window length L and side lobe attenuation r of the initial envelope waveform, for example, when the initial envelope waveform is a Chebyshev envelope waveform.

Certainly, when the initial envelope waveform is in another form, the design parameter may be determined based on characteristics of the corresponding initial envelope waveform.

Step 2.2: Shift the initial envelope waveform in a corresponding domain (time domain in this embodiment) based on a quantity K of times of overlapped multiplexing and a preset shift interval, to obtain shifted envelope waveforms h(t−i*ΔT) at fixed intervals.

The shift interval is a time interval ΔT, and the time interval ΔT is: ΔT=L/K. In this case, a symbol width of a signal is ΔT.

In addition, it further needs to be ensured that ΔT is not less than a reciprocal of a system sampling rate.

A value of i is related to an input symbol length N, and i is an integer from 0 to N−1. For example, when N=8, i is an integer from 0 to 7.

Step 2.3: Convert an input digital signal sequence into a signal symbol sequence represented by using positive and negative symbols.

Specifically, 0 and 1 in the input digital signal sequence are converted into +A and −A respectively, to obtain the positive-negative symbol sequence, where a value of A is any non-zero number. For example, when A is 1, an input {0, 1} bit sequence is converted into a {+1, −1} symbol sequence through BPSK (binary phase shift keying) modulation.

Step 2.4: Multiply the signal symbol sequence $x_i$ (in this embodiment, $x_i$={+1 +1 −1 −1 −1 +1 −1 +1}) obtained after conversion by the shifted envelope waveforms h(t−i*ΔT) at fixed intervals, to obtain modulated envelope waveforms $x_i$ h(t−i*ΔT).

Step 2.5: Superimpose the modulated envelope waveforms $x_i$ h(t−i*ΔT) in the corresponding domain (time domain in this embodiment), to obtain a complex modulated envelope waveform carrying the input signal sequence, namely, a transmitted signal.

The transmitted signal may be represented as follows:

$$s(t) = \sum_i x_i h(t - i \times \Delta T)$$

Step 2.6: Transmit the obtained complex modulated envelope waveform as the transmit signal.

Therefore, in this embodiment, when the value of A is 1, output signals (the output signal symbol sequence) obtained after superimposition are: s(t)={+1 +2 +1 −1 −3 −1 −1 +1}. Referring to FIG. 13, FIG. 13 is a schematic principle diagram of multiplexing of K waveforms. The diagram is in a shape of a parallelogram. Each row represents a to-be-sent signal waveform $x_i$h(t−i*ΔT) obtained after a to-be-sent symbol $x_i$ is multiplied by an envelope waveform h(t−i*ΔT) of a corresponding moment. $a_0$ to $a_{k-1}$ represent a coefficient value of each part obtained after each window function waveform (an envelope waveform) is segmented for K times, and are specifically a coefficient related to an amplitude.

When the input digital signal sequence is converted into the positive-negative symbol sequence, 0 and 1 in the input digital signal sequence are converted into ±A, to obtain the positive-negative symbol sequence, where the value of A is any non-zero number. For example, when the value of A is 1, the input {0, 1} bit sequence is converted into the {+1, −1} symbol sequence through BPSK modulation, to obtain the positive-negative symbol sequence. Therefore, FIG. 12 is a schematic principle diagram of a symbol superimposition process of K waveforms. In the superimposition process in FIG. 14, left three numbers in the first row represent the first input symbol +1, left three numbers in the second row represent the second input symbol +1, left three numbers in the third row represent the third input symbol −1, middle three numbers in the first row represent the fourth input symbol −1, middle three numbers in the second row represent the fifth input symbol −1, middle three numbers in the third row represent the sixth input symbol +1, right three numbers in the first row represent the seventh input symbol −1, and right three numbers in the second row represent the eighth input symbol +1. Therefore, after three waveforms are superimposed, obtained output symbols are {+1 +2 +1 −1 −3 −1 −1 +1}.

Figures 14, 15:
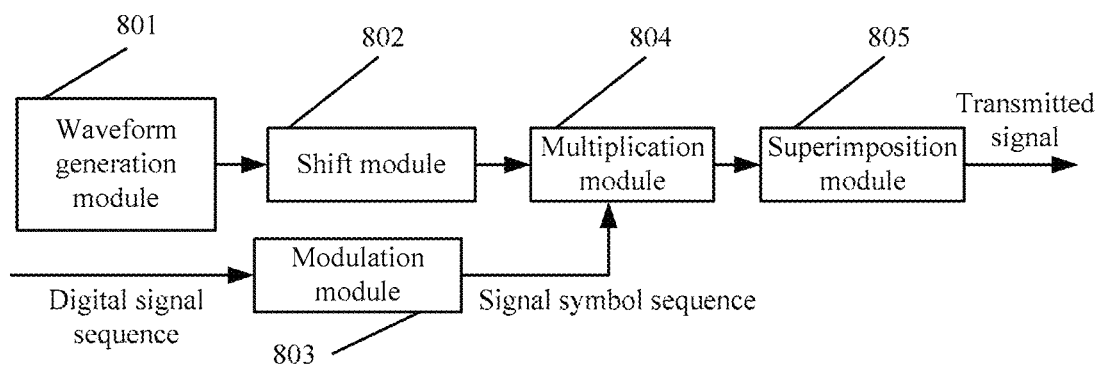
FIG. 14 is a schematic principle diagram of a symbol superimposition process of K waveforms.
FIG. 15 is a schematic structural diagram of a modulation device in a transmitter according to an embodiment of this application.

Certainly, if the input symbol length is another value, superimposition may be performed based on the manner shown in FIG. 13 and FIG. 14, to obtain output symbols.

In this embodiment, the decoding method provided in Embodiment 1 is used in the demodulation step. The demodulation step is not described in detail herein.

Embodiment 4

Figure 3:
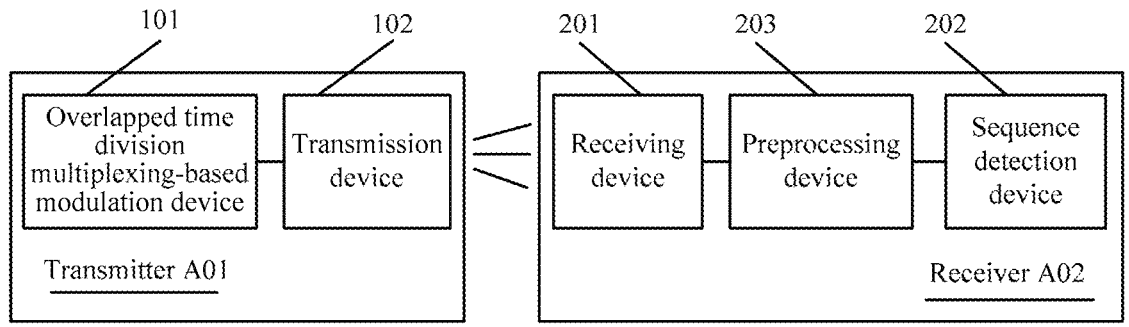
FIG. 3 is a schematic structural diagram of an overlapped time division multiplexing system.
Figure 4:
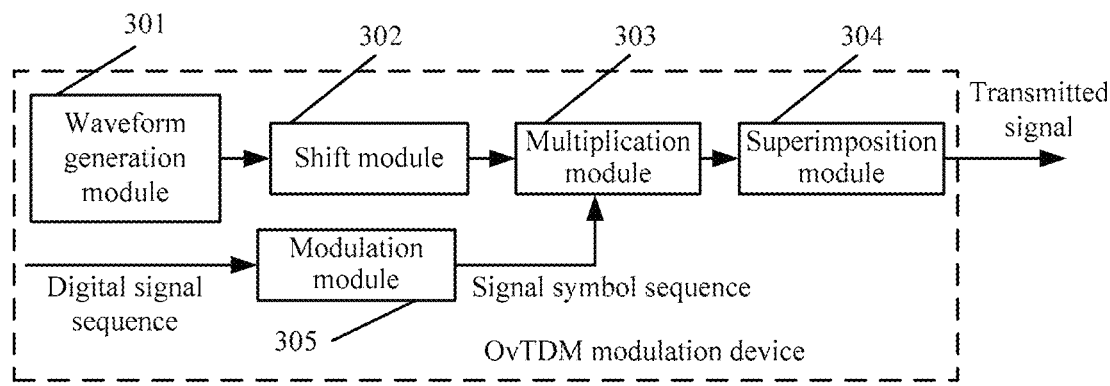
FIG. 4 is a schematic structural diagram of an overlapped time division multiplexing-based modulation device.
Figure 5:
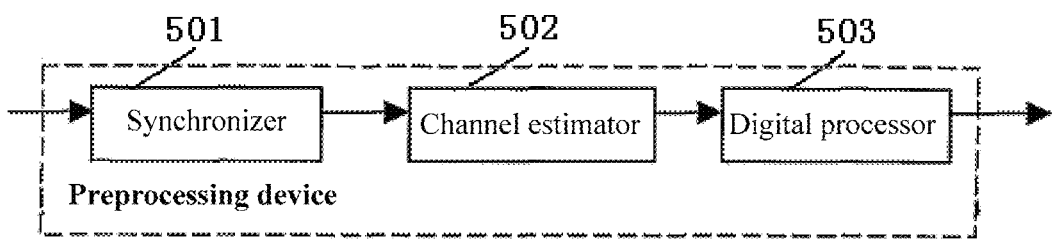
FIG. 5 is a schematic structural diagram of a preprocessing device of a receiver.
Figure 6:
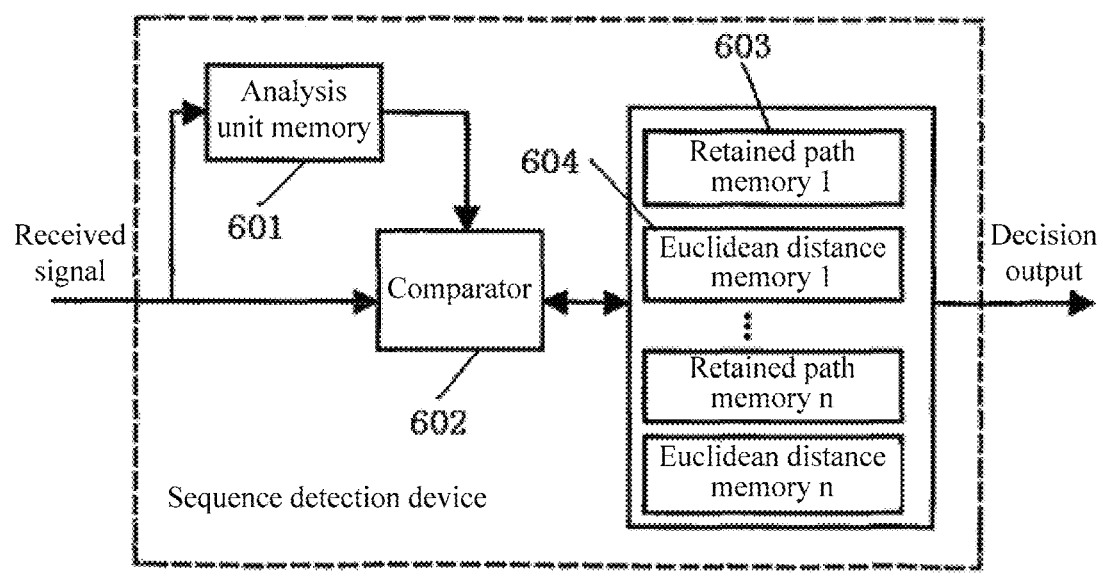
FIG. 6 is a schematic structural diagram of a sequence detection device of a receiver.

Referring to FIG. 3, based on the overlapped multiplexing-based modulation and demodulation method provided in Embodiment 3, this embodiment correspondingly provides an overlapped multiplexing-based modulation and demodulation system, including a transmitter and a receiver.

The transmitter includes a modulation device and a transmission device. Referring to FIG. 15, the modulation device includes a waveform generation module 801, a shift module 802, a modulation module 803, a multiplication module 804, and a superimposition module 805.

The waveform generation module 801 is configured to generate an initial envelope waveform. This embodiment is mainly described by using overlapped time division multiplexing-based modulation and demodulation. The waveform generation module 801 generates an initial envelope waveform h(t) in time domain based on a design parameter.

During generation of the initial envelope waveform, a user may enter the design parameter, to implement flexible configuration in an actual system based on a system performance indicator.

In some embodiments, when side lobe attenuation of the initial envelope waveform has been determined, the design parameter includes a window length L of the initial envelope waveform, for example, when the initial envelope waveform is a Bartlett envelope waveform.

In some embodiments, the design parameter includes a window length L and side lobe attenuation r of the initial envelope waveform, for example, when the initial envelope waveform is a Chebyshev envelope waveform.

Certainly, when the initial envelope waveform is in another form, the design parameter may be determined based on characteristics of the corresponding initial envelope waveform.

The shift module 802 is configured to shift the initial envelope waveform in a corresponding domain (time domain in this embodiment) based on a quantity of times of overlapped multiplexing and a shift interval, to obtain shifted envelope waveforms h(t−i*ΔT) at fixed intervals.

The shift interval is a time interval ΔT, and the time interval ΔT is: ΔT=L/K. In this case, a symbol width of a signal is ΔT.

In addition, it further needs to be ensured that ΔT is not less than a reciprocal of a system sampling rate.

A value of i is related to an input symbol length N, and i is an integer from 0 to N−1. For example, when N=8, i is an integer from 0 to 7.

The modulation module 803 is configured to convert an input digital signal sequence into a signal symbol sequence represented by using positive and negative symbols.

Specifically, 0 and 1 in the input digital signal sequence are converted into +A and −A respectively, to obtain the positive-negative symbol sequence, where a value of A is any non-zero number. For example, when A is 1, an input {0, 1} bit sequence is converted into a {+1, −1} symbol sequence through BPSK (binary phase shift keying) modulation.

The multiplication module 804 is configured to multiply the signal symbol sequence $x_i$ by the shifted envelope waveforms h(t−i*ΔT) at fixed intervals, to obtain modulated envelope waveforms $x_i$ h(t−i*ΔT).

The superimposition module 805 is configured to superimpose the modulated envelope waveforms $x_i$ h(t−i*ΔT) in the corresponding domain (time domain in this embodiment), to obtain a complex modulated envelope waveform carrying the input signal sequence, namely, a transmitted signal.

The transmitted signal may be represented as follows:

$$s(t) = \sum_i x_i h(t - i \times \Delta T)$$

The transmission device is configured to transmit the obtained complex modulated envelope waveform as the transmit signal.

The receiver includes a receiving device configured to receive the complex modulated envelope waveform, and the overlapped multiplexing-based decoding device provided in Embodiment 2. In this embodiment, the decoding device is not described in detail again.

In the overlapped multiplexing-based decoding method and device, and modulation and demodulation method and system provided in the embodiments of this application, a convolution operation with a header and without a tail is split into group operations with both a header and a tail by using a slide group decoding scheme and based on association between adjacent symbols in an OvXDM system, and then each group of sequences is decoded by using a corresponding decoding algorithm, thereby improving decoding efficiency, and reducing decoding complexity while ensuring relatively good performance of the system. This resolves problems in a conventional communications system that, when a Viterbi decoding scheme is used, per-symbol decoding is performed on a receive sequence, and therefore decoding efficiency is relatively row, and decoding complexity increases as a quantity of times of overlapping increases.

It should be noted that the overlapped multiplexing-based decoding method and device, and modulation and demodulation method and system provided in the embodiments of this application may be applied to wireless communications systems such as mobile communications, satellite communications, microwave line-of-sight communications, scatter communications, atmospheric optical communications, infrared communications, and underwater acoustic communications systems; and may be applied to both large-capacity wireless transmission and small-capacity lightweight radio systems.

A person skilled in the art may understand that all or some of the steps of the methods in the foregoing implementations may be implemented by a program controlling related hardware. The program may be stored in a computer-readable storage medium. The storage medium may include a read-only memory, a random access memory, a magnetic disk, an optical disk, or the like.

The foregoing content is a further detailed description of this application with reference to specific embodiments, and it should not be considered that specific implementation of this application is limited only to the description. A person of ordinary skill in the technical field to which this application belongs may further make simple derivations or replacements without departing from the inventive concept of this application.

What is claimed is:

1. An overlapped multiplexing-based decoding method, comprising:
   step 1: setting a group sequence length based on a length of a multiplexing waveform in a received signal, and grouping receive sequences in the received signal;
   step 2: converting a multiplexing waveform coefficient into a matrix form based on the group sequence length;
   step 3: decoding a receive sequence of a current group by using a preset algorithm, to obtain a transmit sequence of the current group in an original signal;
   step 4: if there is known information in the receive sequence of the current group, removing the known information; otherwise, proceeding to step 5;
   step 5: sliding the receive sequence backward, and repeating step 3 and step 4, until all groups are decoded; and
   step 6: outputting a decoding result after all the groups are decoded.

2. The method according to claim 1, wherein when the multiplexing waveform coefficient is converted into the matrix form based on the group sequence length, a representation is:

$$\begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \cdots & h_0 & 0 \\ 0 & h_{K-1} & h_{K-2} & \cdots & h_0 \end{bmatrix}_{M \times M}$$

wherein h is the multiplexing waveform coefficient, and M is the group sequence length.

3. The method according to claim 1, wherein the preset algorithm is a gradient algorithm, a least squares algorithm, a steepest descent algorithm, a conjugate gradient algorithm, an accelerated conjugate gradient algorithm, or an accelerated Chebyshev algorithm.

4. The method according to claim 1, wherein when the receive sequence of the current group is decoded by using the preset algorithm, the method further comprises: storing a non-variable in the preset algorithm, and calling the non-variable during decoding.

5. The method according to claim 4, wherein the preset algorithm is a least squares algorithm, and the non-variable is $(H^T \times H)^{-1} \times H^T$, wherein H is a matrix obtained after conversion of the multiplexing waveform coefficient.

6. An overlapped multiplexing-based decoding device, comprising:
   a grouping module, configured to set a group sequence length based on a length of a multiplexing waveform in a received signal, and group receive sequences in the received signal;
   a conversion module, configured to convert a multiplexing waveform coefficient into a matrix form based on the group sequence length;
   a decoding module, configured to decode a receive sequence of a current group by using a preset algorithm, to obtain a transmit sequence of the current group in an original signal;
   a known information removal module, configured to: when there is known information in the receive sequence of the current group, remove the known information;

a sliding module, configured to slide the receive sequence backward, and control the decoding module and the known information removal module to repeatedly perform a decoding step, until all groups are decoded; and an output module, configured to output a decoding result after all the groups are decoded.

7. The device according to claim 6, wherein when the multiplexing waveform coefficient is converted into the matrix form based on the group sequence length, a representation is:

$$\begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \cdots & h_0 & 0 \\ 0 & h_{K-1} & h_{K-2} & \cdots & h_0 \end{bmatrix}_{M \times M}$$

wherein h is the multiplexing waveform coefficient, and M is the group sequence length.

8. The device according to claim 6, wherein the preset algorithm is a gradient algorithm, a least squares algorithm, a steepest descent algorithm, a conjugate gradient algorithm, an accelerated conjugate gradient algorithm, or an accelerated Chebyshev algorithm.

9. The device according to claim 6, further comprising a storage module, configured to store a non-variable in the preset algorithm, and the decoding module calls the non-variable during decoding.

10. The device according to claim 9, wherein the preset algorithm is a least squares algorithm, and the non-variable is $(H^T \times H)^{-1} \times H^T$, wherein H is a matrix obtained after conversion of the multiplexing waveform coefficient.

11. An overlapped multiplexing-based modulation and demodulation method, comprising a modulation step and a demodulation step, wherein the modulation step comprises:

generating an initial envelope waveform;

shifting the initial envelope waveform in a corresponding domain at a shift interval based on a quantity of times of overlapped multiplexing, to obtain shifted envelope waveforms at fixed intervals;

converting an input digital signal sequence into a signal symbol sequence represented by using positive and negative symbols;

multiplying the signal symbol sequence by offset shifted envelope waveforms at fixed intervals, to obtain modulated envelope waveforms;

superimposing the modulated envelope waveforms in the corresponding domain, to obtain a complex modulated envelope waveform carrying the digital signal sequence; and transmitting the complex modulated envelope waveform; and the decoding method used in the demodulation step comprises:

step 1: setting a group sequence length based on a length of a multiplexing waveform in a received signal, and grouping receive sequences in the received signal;

step 2: converting a multiplexing waveform coefficient into a matrix form based on the group sequence length;

step 3: decoding a receive sequence of a current group by using a preset algorithm, to obtain a transmit sequence of the current group in an original signal;

step 4: if there is known information in the receive sequence of the current group, removing the known information; otherwise, proceeding to step 5;

step 5: sliding the receive sequence backward, and repeating step 3 and step 4, until all groups are decoded; and step 6: outputting a decoding result after all the groups are decoded.

12. The overlapped multiplexing-based modulation and demodulation method according to claim 11, wherein when the multiplexing waveform coefficient is converted into the matrix form based on the group sequence length, a representation is:

$$\begin{bmatrix} h_0 & 0 & 0 & 0 & 0 \\ h_1 & h_0 & 0 & 0 & 0 \\ h_2 & h_1 & h_0 & 0 & 0 \\ \vdots & \vdots & \vdots & 0 & 0 \\ h_{K-1} & h_{K-2} & \cdots & h_0 & 0 \\ 0 & h_{K-1} & h_{K-2} & \cdots & h_0 \end{bmatrix}_{M \times M}$$

wherein h is the multiplexing waveform coefficient, and M is the group sequence length.

13. The overlapped multiplexing-based modulation and demodulation method according to claim 11, wherein the preset algorithm is a gradient algorithm, a least squares algorithm, a steepest descent algorithm, a conjugate gradient algorithm, an accelerated conjugate gradient algorithm, or an accelerated Chebyshev algorithm.

14. The overlapped multiplexing-based modulation and demodulation method according to claim 11, wherein when the receive sequence of the current group is decoded by using the preset algorithm, the method further comprises: storing a non-variable in the preset algorithm, and calling the non-variable during decoding.

15. The overlapped multiplexing-based modulation and demodulation method according to claim 14, wherein the preset algorithm is a least squares algorithm, and the non-variable is $(H^T \times H)^{-1} \times H^T$, wherein H is a matrix obtained after conversion of the multiplexing waveform coefficient.

\* \* \* \* \*